(12) United States Patent
Wang et al.

(10) Patent No.: US 10,868,600 B2
(45) Date of Patent: Dec. 15, 2020

(54) METHOD FOR REPORTING AND RECEIVING CHANNEL STATE INFORMATION, AND DEVICE

(71) Applicant: Huawei Technologies Co., Ltd., Guangdong (CN)

(72) Inventors: Jianguo Wang, Bonn (DE); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 14/868,762

(22) Filed: Sep. 29, 2015

(65) Prior Publication Data

US 2016/0020846 A1 Jan. 21, 2016

Related U.S. Application Data

(63) Continuation of application No. PCT/CN2013/073691, filed on Apr. 3, 2013.

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0639* (2013.01)

(58) Field of Classification Search
CPC ... H04B 7/0456; H04B 7/0626; H04B 7/0639
See application file for complete search history.

(56) References Cited

U.S. PATENT DOCUMENTS

| | | | |
|---|---|---|---|
| 8,391,392 B2 | 3/2013 | Melzer et al. | |
| 8,737,507 B2 | 5/2014 | Astely et al. | |

(Continued)

FOREIGN PATENT DOCUMENTS

| | | |
|---|---|---|
| CN | 101635612 A | 1/2010 |
| CN | 101686079 A | 3/2010 |

(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 11)", 3GPP TS 36.212 V11.2.0, Feb. 2013, 82 pages.

(Continued)

*Primary Examiner* — Redentor Pasia
(74) *Attorney, Agent, or Firm* — Gregg L. Jansen

(57) ABSTRACT

Embodiments of the present invention provide a method for reporting and receiving channel state information (CSI), and a device. The reporting method includes: acquiring reference signal resource configuration information, where antenna port configuration information in the reference signal resource configuration information is used to indicate an antenna port structure; receiving, according to the reference signal resource configuration information, a reference signal sent by a base station; selecting a precoding matrix from a codebook based on the received reference signal, where a structure of the precoding matrix corresponds to the antenna port structure indicated by the antenna port configuration information; and reporting, to the base station, a PMI used to indicate the selected precoding matrix. According to the technical solutions of the present invention, a problem of reporting CSI in an AAS base station scenario is resolved, and precision of CSI reporting is improved.

16 Claims, 7 Drawing Sheets

(56) References Cited

U.S. PATENT DOCUMENTS

| | | | |
|---|---|---|---|
| 9,209,877 | B2 | 12/2015 | Wang et al. |
| 9,214,996 | B2 | 12/2015 | Kim et al. |
| 2009/0003466 | A1 | 1/2009 | Taherzadehboroujeni et al. |
| 2010/0045494 | A1 | 2/2010 | Clerckx et al. |
| 2010/0172430 | A1 | 7/2010 | Melzer et al. |
| 2010/0322343 | A1 | 12/2010 | Yeon et al. |
| 2011/0080969 | A1 | 4/2011 | Jöngren et al. |
| 2011/0110405 | A1 | 5/2011 | Lee et al. |
| 2011/0170638 | A1 | 7/2011 | Yuan et al. |
| 2011/0205930 | A1 | 8/2011 | Rahman et al. |
| 2011/0216846 | A1* | 9/2011 | Lee .............. H04B 7/0473 375/295 |
| 2011/0235743 | A1 | 9/2011 | Lee et al. |
| 2011/0249712 | A1 | 10/2011 | Hammarwall et al. |
| 2011/0274188 | A1* | 11/2011 | Sayana .............. H04B 7/0639 375/260 |
| 2012/0082248 | A1 | 4/2012 | Han et al. |
| 2012/0106595 | A1 | 5/2012 | Bhattad et al. |
| 2012/0219042 | A1 | 8/2012 | Onggosanusi et al. |
| 2012/0238039 | A1 | 9/2012 | Cha et al. |
| 2012/0322492 | A1 | 12/2012 | Koo et al. |
| 2012/0328039 | A1 | 12/2012 | Mazzarese et al. |
| 2013/0010880 | A1 | 1/2013 | Koivisto et al. |
| 2013/0028341 | A1 | 1/2013 | Ayach et al. |
| 2013/0028344 | A1 | 1/2013 | Chen et al. |
| 2013/0034179 | A1 | 2/2013 | Zhang et al. |
| 2013/0058305 | A1 | 3/2013 | Jang et al. |
| 2013/0058386 | A1 | 3/2013 | Mazzarese |
| 2013/0058424 | A1 | 3/2013 | Enescu et al. |
| 2013/0114654 | A1 | 5/2013 | Gomadam |
| 2013/0129018 | A1 | 5/2013 | Ko et al. |
| 2013/0156125 | A1 | 6/2013 | Ko et al. |
| 2013/0163687 | A1 | 6/2013 | Jing et al. |
| 2013/0230081 | A1 | 9/2013 | Wernersson et al. |
| 2013/0259151 | A1* | 10/2013 | Thomas .............. H04L 25/03949 375/267 |
| 2013/0308715 | A1* | 11/2013 | Nam .............. H04B 7/0469 375/267 |
| 2013/0315328 | A1 | 11/2013 | Liu |
| 2014/0098689 | A1* | 4/2014 | Lee .............. H04B 7/0469 370/252 |
| 2014/0133595 | A1 | 5/2014 | Mazzarese et al. |
| 2014/0146778 | A1 | 5/2014 | Wang et al. |
| 2014/0177744 | A1 | 6/2014 | Krishnamurthy et al. |
| 2014/0177745 | A1 | 6/2014 | Krishnamurthy et al. |
| 2014/0192762 | A1 | 7/2014 | Li et al. |
| 2014/0226702 | A1 | 8/2014 | Onggosanusi et al. |
| 2014/0301492 | A1 | 10/2014 | Xin et al. |
| 2015/0012551 | A1 | 1/2015 | Dong et al. |
| 2015/0049829 | A1* | 2/2015 | Zhuang .............. H04L 5/0037 375/267 |
| 2015/0244438 | A1 | 8/2015 | Ding et al. |
| 2016/0043789 | A1 | 2/2016 | Wang et al. |
| 2018/0097553 | A1 | 4/2018 | Wang et al. |

FOREIGN PATENT DOCUMENTS

| | | |
|---|---|---|
| CN | 101771444 A | 7/2010 |
| CN | 101969366 A | 2/2011 |
| CN | 102075274 A | 5/2011 |
| CN | 102082637 A | 6/2011 |
| CN | 102111197 A | 6/2011 |
| CN | 102122983 A | 7/2011 |
| CN | 102130752 A | 7/2011 |
| CN | 102273091 A | 12/2011 |
| CN | 102299732 A | 12/2011 |
| CN | 102299775 A | 12/2011 |
| CN | 102315871 A | 1/2012 |
| CN | 102714647 A | 10/2012 |
| CN | 102835054 A | 12/2012 |
| CN | 102870344 A | 1/2013 |
| CN | 102932112 A | 2/2013 |
| CN | 102938688 A | 2/2013 |
| CN | 102959878 A | 3/2013 |
| CN | 103039014 A | 4/2013 |
| CN | 103560818 A | 2/2014 |
| CN | 103782533 A | 5/2014 |
| EP | 2557700 A2 | 2/2013 |
| EP | 2590338 A2 | 5/2013 |
| EP | 2755417 A1 | 7/2014 |
| EP | 2820773 B1 | 12/2017 |
| JP | 2012531087 A | 12/2012 |
| JP | 2015528669 A | 9/2015 |
| JP | 2015536099 A | 12/2015 |
| JP | 2016532184 A | 10/2016 |
| WO | 2009096708 A1 | 8/2009 |
| WO | 2011082626 A1 | 7/2011 |
| WO | 2011111975 A2 | 9/2011 |
| WO | 2011136627 A2 | 11/2011 |
| WO | 2012002767 A2 | 1/2012 |
| WO | WO 2012/002767 A2 | 1/2012 |
| WO | 2012026742 A2 | 3/2012 |
| WO | 2012155511 A1 | 11/2012 |
| WO | 2013024351 A1 | 2/2013 |
| WO | WO 2013/024350 A2 | 2/2013 |
| WO | 2013/034109 A1 | 3/2013 |
| WO | 2013129985 A1 | 9/2013 |
| WO | 2013185320 A1 | 12/2013 |
| WO | 2014/007591 A1 | 1/2014 |

OTHER PUBLICATIONS

Alcatel-Lucent Shanghai Bell et al., "Considerations on CSI feedback enhancements for high-priority antenna configurations", 3GPP TSG-RAN WG1 #66, R1-112420, Aug. 2011, 8 pages.

Pantech, "Extension of Rel-8 codebook for dual stage Rel-10 precoder," 3GPP TSG RAN Working Group 1 Meeting 60bis, R1-102409, Apr. 2010, 3 pages.

LG Electronics, "Consideration on feedback design for LTE-A," R1-102724, 3GPP TSG RAN WG1 Meeting #61, Montreal, Canada, May 10-14, 2010, 4 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, Mar. 2013, 344 pages.

"3rd Generation Partnership Project; Technical Specification Group Radio Access Network; Evolved Universal Terrestrial Radio Access (E-UTRA); Physical layer procedures (Release 11)", 3GPP TS 36.213 V11.2.0, Feb. 2013, 173 pages.

"3rd Generation Partnership Project; Technical Specification Group Radio Access Network; Evolved Universal Terrestrial Radio Access (E-UTRA); Radio Resource Control (RRC); Protocol specification(Release 10)", 3GPP TS 36.331 V10.8.0 (Dec. 2012); 305 pages.

"3rd Generation Partnership Project; Technical Specification Group Radio Access Network; Evolved Universal Terrestrial Radio Access (E-UTRA; Physical Channels and Modulation (Release 10)," 3GPP TS 36.211 V10.3.0, pp. 1-103, 3rd Generation Partnership Project, Valbonne, France (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.4.0 pp. 1-101, 3rd Generation Partnership Project, Valbonne, France (Dec. 2011).

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.2.0, pp. 1-109, 3rd Generation Partnership Project, Valbonne, France (Feb. 2013).

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.3.0, pp. 1-108, 3rd Generation Partnership Project, Valbonne, France (Jun. 2013).

"3rd Generation Partnership Project; Technical Specification Group Radio Access Network; Evolved Universal Terrestrial Radio Access

(56) References Cited

OTHER PUBLICATIONS (E-UTRA); Multiplexing and channel coding (Release 11)," 3GPP TS 36.212 V11.3.0, pp. 1-84, 3rd Generation Partnership Project, Valbonne, France (Jun. 2013).
"3rd Generation Partnership Project; Technical Specification Group Radio Access Network; Evolved Universal Terrestrial Radio Access (E-UTRA); Physical layer procedures (Release 10)," 3GPP TS 36.213 V10.3.0, pp. 1-122, 3rd Generation Partnership Project, Valbonne, France (Sep. 2011).
"3rd Generation Partnership Project; Technical Specification Group Radio Access Network; Evolved Universal Terrestrial Radio Access (E-UTRA); Physical layer procedures (Release 10)," 3GPP TS 36.213 V10.5.0, pp. 1-125, 3rd Generation Partnership Project, Valbonne, France (Mar. 2012).
3rd Generation Partnership Project; Technical Specification Group Radio Access Network; Evolved Universal Terrestrial Radio Access (E-UTRA); Physical layer procedures (Release 11), 3GPP TS 36.213 V11.2.0, pp. 1-173, 3rd Generation Partnership Project, Valbonne, France (Feb. 2013).
"3rd Generation Partnership Project; Technical Specification Group Radio Access Network; Evolved Universal Terrestrial Radio Access (E-UTRA); Physical layer procedures (Release 11)," 3GPP TS 36.213 V11.3.0, pp. 1-176, 3rd Generation Partnership Project, Valbonne, France (Jun. 2013).
"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.3.0, pp. 1-344, 3rd Generation Partnership Project, Valbonne, France (Mar. 2013).
"Simulation Assumption for 8 Tx Codebook Design," 3GPP TSG RAN WG1 Meeting #60bis, Beijing, China, R1-102508, pp. 1-8, 3rd Generation Partnership Project, Valbonne, France (Apr. 12-16, 2010).
"Way Forward on 8Tx Codebook for Rel.10 DL MIMO," 3GPP TSG RAN WG1 62, Madrid, Spain, R1-105011, pp. 1-6, 3rd Generation Partnership Project, Valbonne, France (Aug. 23-27, 2010).
"Views on the feedback framework for Rel. 10," 3GPP TSG RAN WG1 Meeting #61, Montreal, Canada, R1-103377, pp. 1-17, 3rd Generation Partnership Project, Valbonne, France (May 10-14, 2010).
"New SID Proposal: Study on Full Dimension MIMO for LTE," 3GPP TSG RAN Meeting #57, Chicago, USA, RP-121410, pp. 1-7, 3rd Generation Partnership Project, Valbonne, France (Sep. 4-7, 2012).
"CQI/PMI reporting modes on PUCCH for two-stage feedback," 3GPP TSG RAN WG1 Meeting #62, Madrid, Spain, Tdoc R1-104397, pp. 1-4, 3rd Generation Partnership Project, Valbonne, France (Aug. 23-27, 2010).
"PMI/RI/CQI reporting for LTE-A," 3GPP TSG RAN WG1 Meeting #60bis, Beijing, China, R1-102056, pp. 1-4, 3rd Generation Partnership Project, Valbonne, France (Apr. 12-16, 2010).
"Performance evaluation of 8Tx precoding codebooks," 3GPP TSG RAN WG1 Meeting #61, Montreal, Canada, R1-102658, pp. 1-7, 3rd Generation Partnership Project, Valbonne, France (May 10-14, 2010).
"TP on multiple-column array antenna modeling," 3GPP TSG-RAN4 Meeting #64bis, Santa Rosa, US, R4-125978, pp. 2-8, 3rd Generation Partnership Project, Valbonne, France (Oct. 8-12, 2012).
"Design and Evaluation of Precoder Codebooks for CSI Feedback," 3GPP TSG-RAN WG1 #61bis, Dresden, Germany, R1-103839, pp. 1-12, 3rd Generation Partnership Project, Valbonne, France (Jun. 28-Jul. 2, 2010).
"Further considerations on dual layer beamforming," 3GPP TSG-RAN WG1 #57, San Francisco, USA, R1-092187, pp. 1-5, 3rd Generation Partnership Project, Valbonne, France (May 4-8, 2009).
"Feedback Codebook Enhancement and Performance Evaluation," 3GPP TSG RAN WG1 Meeting #62, Madrid, Spain, R1-104768, pp. 1-9, 3rd Generation Partnership Project, Valbonne, France (Aug. 23-28, 2010).
"UCI transmission for Simultaneous PUCCH/PUSCH configuration," 3GPP TSG RAN WG1 Meeting #63bis, Dublin, Ireland, R1-110395, pp. 1-4, 3rd Generation Partnership Project, Valbonne, France (Jan. 17-21, 2011).
Regalia et al., "Kronecker Products, Unitary Matrices and Signal Processing Applications," vol. 31, No. 4, XP055258118, pp. 586-613, Society for Industrial and Applied Mathematics (Dec. 1989).
"Considerations on CSI feedback enhancements for high-priority antenna configurations," 3GPP TSG-RAN WG1 #66, Athens Greece, R1-112420, pp. 1-7, 3rd Generation Partnership Project, Valbonne, France (Aug. 22-26, 2011).
"WF on antenna model in 3D channel modeling," 3GPP TSG RAN WG1 #72bis, Chicago, USA, R1-131761, pp. 1-7, 3rd Generation Partnership Project, Valbonne, France (Apr. 15-19, 2013).
"Study on Downlink Enhancements for Elevation Beamforming for LTE," 3GPP Work Item Description, RP-121413, pp. 1-5, 3rd Generation Partnership Project, Valbonne, France (Sep. 5, 2012).

* cited by examiner

Antenna array A

Antenna array B

Antenna array C

Antenna array D

Antenna array E

Antenna array F

METHOD FOR REPORTING AND RECEIVING CHANNEL STATE INFORMATION, AND DEVICE

CROSS-REFERENCE TO RELATED APPLICATIONS

This application is a continuation of International Application No. PCT/CN2013/073691, filed on Apr. 3, 2013, which is hereby incorporated by reference in its entirety.

TECHNICAL FIELD

Embodiments of the present invention relate to communications technologies, and in particular, to a method for reporting and receiving channel state information, and a device.

BACKGROUND

A multiple input multiple output (MIMO) system can obtain diversity and array gains by means of transmit precoding and receive signal combination. In a MIMO system that uses precoding, a received signal may be expressed as: y=HVs+n, where y is a received signal vector, H is a channel matrix, V is a precoding matrix, s is a transmitted symbol vector, and n is an interference and noise vector. To implement optimal precoding, a transmitter needs to fully learn channel state information (CSI). In an existing Long Term Evolution (LTE) R8-R11 system, the CSI includes a rank indicator (RI), a precoding matrix indicator (PMI), a channel quality indicator (CQI), and the like, where the RI and the PMI respectively indicate a quantity of used layers and a used precoding matrix. Generally, a set of used precoding matrices is referred to as a codebook, and each precoding matrix is a code word in the codebook. Codebooks in the existing LTE R8-R11 system are all designed based on an antenna of a conventional base station. The antenna of the conventional base station has a fixed or a remote electrical downtilt, and an antenna beam of the conventional base station can be dynamically adjusted only in a horizontal direction by means of precoding or beam forming.

To further improve spectral efficiency, it is considered introducing more antenna configurations, particularly, an antenna configuration based on an active antenna system (AAS), into an LTE R12 system. On one hand, unlike the conventional base station, an AAS base station further provides a degree of freedom of an antenna in a vertical direction, which is implemented mainly by using a two-dimensional antenna array in the horizontal and vertical directions of the AAS base station. On the other hand, for the AAS base station, more antenna ports may be considered, for example, a quantity of antenna ports currently considered may be 8, 16, 32, or 64. In addition, even if there is a same quantity of antenna ports, an antenna array structure may be different; therefore, for an antenna port with a same serial number, different channel state measurements may be obtained in different array structures. In this case, CSI reporting or feedback is required to automatically adapt to an antenna array structure. It should be particularly noted that, during design of a new LTE R12 system, backward compatibility is also an important consideration, for example, it is required that an LTE R12 system equipped with an AAS base station can ensure that legacy user equipment (UE) of the LTE R8-R11 can work normally or performance of the legacy user equipment of the LTE R8-R11 does not degrade. However, in the prior art, antenna port configuration information and a method for reporting CSI especially an existing structure of the precoding matrix cannot automatically adapt to a requirement of antenna configuration of the AAS base station. Therefore, it is required to provide a CSI reporting solution that is applicable to an AAS base station scenario, so as to improve precision of CSI feedback, and fully use an advantage that the AAS base station increases a system capacity and improve coverage by using degrees of freedom in horizontal and vertical directions.

SUMMARY

Embodiments of the present invention provide a method for reporting and receiving channel state information and a device, so as to resolve a problem of reporting CSI in an AAS base station scenario, and improve precision of CSI reporting or feedback.

According to a first aspect, a method for reporting channel state information is provided, including:

acquiring reference signal resource configuration information, where the reference signal resource configuration information includes antenna port configuration information, and the antenna port configuration information is used to indicate an antenna port structure;

receiving, according to the reference signal resource configuration information, a reference signal sent by a base station;

selecting a precoding matrix from a codebook based on the received reference signal, where a structure of the precoding matrix corresponds to the antenna port structure indicated by the antenna port configuration information; and reporting a precoding matrix indicator PMI to the base station, where the PMI is used to indicate the selected precoding matrix.

With reference to the first aspect, in a first possible implementation manner of the first aspect, the antenna port configuration information includes an index m and an index n, where the index m corresponds to a quantity of rows in the antenna port structure, and the index n corresponds to a quantity of columns in the antenna port structure.

With reference to the first possible implementation manner of the first aspect, in a second possible implementation manner of the first aspect, the structure of the precoding matrix is $W=W_1W_2$, where $$W_1 = \begin{bmatrix} X & 0 \\ 0 & X \end{bmatrix},$$

and $X=A \otimes B$; $\otimes$ indicates a Kronecker product; A and B are matrices of m×p and (n/2)×q respectively, or A and B are matrices of (m/2)×p and n×q respectively; $W_2$ is a matrix of (pq)×r, where p and q are positive integers, and r is a rank of the precoding matrix.

With reference to the first possible implementation manner of the first aspect, in a third possible implementation manner of the first aspect, the structure of the precoding matrix is $W=W_1W_2$, where $W_1=A \otimes B$; $\otimes$ indicates a Kronecker product; A and B are matrices of m×p and n×q respectively, or A and B are matrices of n×p and m×q respectively; $W_2$ is a matrix of (pq)×r, where p and q are positive integers, and r is a rank of the precoding matrix.

With reference to the second possible implementation manner of the first aspect or the third possible implementation manner of the first aspect, in a fourth possible implementation manner of the first aspect, the PMI includes a first PMI used to indicate the matrix $W_1$ and a second PMI used to indicated the matrix $W_2$; where the reporting a precoding matrix indicator PMI to the base station includes:

separately reporting the first PMI and the second PMI to the base station.

According to a second aspect, a method for receiving channel state information is provided, including:

sending a reference signal to user equipment, where the user equipment receives the reference signal based on pre-acquired reference signal resource configuration information, the reference signal resource configuration information includes antenna port configuration information, and the antenna port configuration information is used to indicate an antenna port structure; and receiving a precoding matrix indicator PMI reported by the user equipment, where the PMI is used to indicate a precoding matrix selected by the user equipment, the precoding matrix is selected by the user equipment from a codebook based on the reference signal, and a structure of the precoding matrix corresponds to the antenna port structure indicated by the antenna port configuration information.

With reference to the second aspect, in a first possible implementation manner of the second aspect, the antenna port configuration information includes an index m and an index n, where the index m corresponds to a quantity of rows in the antenna port structure, and the index n corresponds to a quantity of columns in the antenna port structure.

With reference to the first possible implementation manner of the second aspect, in a second possible implementation manner of the second aspect, the structure of the precoding matrix is $W=W_1W_2$, where $$W_1 = \begin{bmatrix} X & 0 \\ 0 & X \end{bmatrix},$$

and $X=A\otimes B$; $\otimes$ indicates a Kronecker product; A and B are matrices of m×p and n×q respectively, $W_2$ or A and B are matrices of (m/2)×p and n×q respectively; $W_2$ is a matrix of (pq)×r where p and q are positive integers, and r is a rank of the precoding matrix.

With reference to the first possible implementation manner of the second aspect, in a third possible implementation manner of the second aspect, the structure of the precoding matrix is $W=W_1W_2$ where $W_1=A\otimes B$; $\otimes$ indicates a Kronecker product; A and B are matrices of m×p and n×q respectively, or A and B are matrices of n×p and m×q respectively; $W_2$ is a matrix of (pq)×r, where p and q are positive integers, and r is a rank of the precoding matrix.

With reference to the second possible implementation manner of the second aspect or the third possible implementation manner of the second aspect, in a fourth possible implementation manner of the second aspect, the PMI includes a first PMI used to indicate the matrix $W_1$ and a second matrix used to indicated the matrix $W_2$; where the receiving a precoding matrix indicator PMI reported by the user equipment includes:

separately receiving the first PMI and the second PMI that are reported by the user equipment.

According to a third aspect, user equipment is provided, including:

an acquiring module, configured to acquire reference signal resource configuration information, where the reference signal resource configuration information includes antenna port configuration information, and the antenna port configuration information is used to indicate an antenna port structure;

a receiving module, configured to receive, according to the reference signal resource configuration information acquired by the acquiring module, a reference signal sent by a base station;

a selecting module, configured to select a precoding matrix from a codebook based on the reference signal received by the receiving module, where a structure of the precoding matrix corresponds to the antenna port structure indicated by the antenna port configuration information; and a sending module, configured to report a precoding matrix indicator PMI to the base station, where the PMI is used to indicate the precoding matrix selected by the selecting module.

With reference to the third aspect, in a first possible implementation manner of the third aspect, the antenna port configuration information includes an index m and an index n, where the index m corresponds to a quantity of rows in the antenna port structure, and the index n corresponds to a quantity of columns in the antenna port structure. With reference to the first possible implementation manner of the third aspect, in a second possible implementation manner of the third aspect, the structure of the precoding matrix is $W=W_1W_2$, where $$W_1 = \begin{bmatrix} X & 0 \\ 0 & X \end{bmatrix},$$

and $X=A\otimes B$; $\otimes$ indicates a Kronecker product; A and B are matrices of m×p and (n/2)×q respectively, or A and B are matrices of (m/2)×p and n×q respectively; $W_2$ is a matrix of (pq)×r, where p and q are positive integers, and r is a rank of the precoding matrix.

With reference to the first possible implementation manner of the third aspect, in a third possible implementation manner of the third aspect, the structure of the precoding matrix is $W=W_1W_2$, where $W_1=A\otimes B$; $\otimes$ indicates a Kronecker product; A and B are matrices of m×p and n×q respectively, or A and B are matrices of n×p and m×q respectively; $W_2$ is a matrix of (pq)×r, where p and q are positive integers, and r is a rank of the precoding matrix.

With reference to the second possible implementation manner of the third aspect or the third possible implementation manner of the third aspect, in a fourth possible implementation manner of the third aspect, the PMI includes a first PMI used to indicate the matrix $W_1$ and a second matrix used to indicated the matrix $W_2$; where the sending module is specifically configured to separately report the first PMI and the second PMI to the base station.

According to a fourth aspect, a base station is provided, including:

a sending module, configured to send a reference signal to user equipment, where the user equipment receives the reference signal based on pre-acquired reference signal resource configuration information, the reference signal resource configuration information includes antenna port configuration information, and the antenna port configuration information is used to indicate an antenna port structure; and a receiving module, configured to receive a precoding matrix indicator PMI reported by the user equipment, where the PMI is used to indicate a precoding matrix selected by the user equipment, the precoding matrix is selected by the user equipment from a codebook based on the reference signal, and a structure of the precoding matrix corresponds to the antenna port structure indicated by the antenna port configuration information.

With reference to the fourth aspect, in a first possible implementation manner of the fourth aspect, the antenna port configuration information includes an index m and an index n, where the index m corresponds to a quantity of rows in the antenna port structure, and the index n corresponds to a quantity of columns in the antenna port structure.

With reference to the first possible implementation manner of the fourth aspect, in a second possible implementation manner of the fourth aspect, the structure of the precoding matrix is $W=W_1W_2$, where $$W_1 = \begin{bmatrix} X & 0 \\ 0 & X \end{bmatrix},$$

and $X=A \otimes B$; $\otimes$ indicates a Kronecker product; A and B are matrices of m×p and (n/2)×q respectively, or A and B are matrices of (m/2)×p and n×q respectively; $W_2$ is a matrix of (pq)×r, where p and q are positive integers, and r is a rank of the precoding matrix.

With reference to the first possible implementation manner of the fourth aspect, in a third possible implementation manner of the fourth aspect, the structure of the precoding matrix is $W=W_1W_2$, where $W_1=A \otimes B$; $\otimes$ indicates a Kronecker product; A and B are matrices of m×p and n×q respectively, or A and B are matrices of n×p and m×q respectively; $W_2$ is a matrix of (pq)×r, where p and q are positive integers, and r is a rank of the precoding matrix.

With reference to the second possible implementation manner of the fourth aspect or the third possible implementation manner of the fourth aspect, in a fourth possible implementation manner of the fourth aspect, the PMI includes a first PMI used to indicate the matrix $W_1$ and a second PMI used to indicated the matrix $W_2$; where the receiving module is specifically configured to separately receive the first PMI and the second PMI that are reported by the user equipment.

According to a fifth aspect, user equipment is provided, including: a processor, a receiver, and a transmitter, where the processor is configured to acquire reference signal resource configuration information, where the reference signal resource configuration information includes antenna port configuration information, and the antenna port configuration information is used to indicate an antenna port structure; and configured to select a precoding matrix from a codebook based on a reference signal received by the receiver, where a structure of the precoding matrix corresponds to the antenna port structure indicated by the antenna port configuration information;

the receiver is configured to receive, according to the reference signal resource configuration information acquired by the processor, the reference signal sent by a base station; and the transmitter is configured to report a precoding matrix indicator PMI to the base station, where the PMI is used to indicate the precoding matrix selected by the processor.

According to a sixth aspect, a base station is provided, including:

a transmitter, configured to send a reference signal to user equipment, where the user equipment receives the reference signal based on pre-acquired reference signal resource configuration information, the reference signal resource configuration information includes antenna port configuration information, and the antenna port configuration information is used to indicate an antenna port structure; and a receiver, configured to receive a precoding matrix indicator PMI reported by the user equipment, where the PMI is used to indicate a precoding matrix selected by the user equipment, the precoding matrix is selected by the user equipment from a codebook based on the reference signal, and a structure of the precoding matrix corresponds to the antenna port structure indicated by the antenna port configuration information According to the method for reporting and receiving channel state information and the user equipment provided in the embodiments of the present invention, reference signal resource configuration information that includes antenna port configuration information is acquired, a reference signal sent by a base station is received according to the reference signal resource configuration information, a precoding matrix is selected from a codebook based on the received reference signal, and a PMI used to indicate the selected precoding matrix is reported to the base station, where the antenna port configuration information indicates an antenna port structure, and a structure of the precoding matrix corresponds to the antenna port structure. In the embodiments of the present invention, more information about the antenna port structure is provided, and the structure of the precoding matrix corresponds to the antenna port structure indicated by the antenna port configuration information. This feature ensures that, in a process of CSI measurement and reporting, degrees of freedom in a horizontal direction and a vertical direction of an antenna of the AAS base station are both considered, so that precision of CSI reporting or feedback can be improved. The method and the user equipment are applicable to a scenario in which an antenna of an AAS base station is deployed, and resolve a problem of CSI reporting in an AAS base station scenario.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1A:
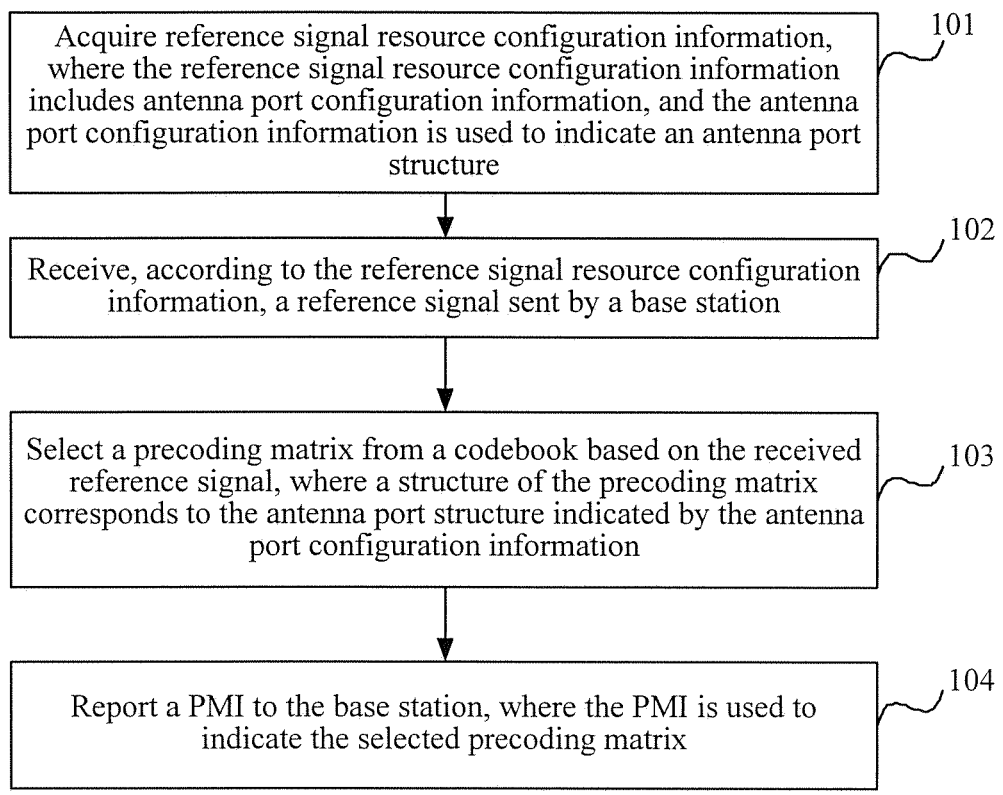
FIG. 1a is a flowchart of a method for reporting channel state information according to an embodiment of the present invention.

FIG. 1a is a flowchart of a method for reporting channel state information according to an embodiment of the present invention. As shown in FIG. 1a, the method includes the following steps:

101. Acquire reference signal resource configuration information, where the reference signal resource configuration information includes antenna port configuration information, and the antenna port configuration information is used to indicate an antenna port structure.

102. Receive, according to the reference signal resource configuration information, a reference signal sent by a base station.

In this embodiment, to receive the reference signal sent by the base station, a UE first acquires the reference signal resource configuration information, and then receives, based on the reference signal resource configuration information, the reference signal sent by the base station.

In this embodiment, in addition to the antenna port configuration information, the reference signal resource configuration information further includes a subframe configuration (for example, a subframe period and a subframe offset of the reference signal) corresponding to the reference signal, a resource element (RE) occupied by the reference signal, and the like. The UE specifically receives, on a subframe and the resource element that are indicated by the reference signal resource configuration information, the reference signal sent by the base station. It is noted herein that a quantity of reference signals is the same as a quantity of antenna ports, where the quantity of antenna ports is indicated by the antenna port configuration information. In this embodiment, the antenna port structure indicated by the antenna port configuration information provides more antenna port information in addition to the quantity of antenna ports.

In an optional implementation manner of this embodiment, a manner of acquiring the reference signal resource configuration information includes that: the UE receives the reference signal resource configuration information sent by the base station by using higher layer signaling or dynamic signaling. The higher layer signaling may be radio resource control (RRC) signaling or Media Access Control (MAC) layer signaling, which, however, is not limited thereto. The dynamic signaling may be downlink control information (DCI) that is sent by using a physical downlink control channel (PDCCH) or an enhanced PDCCH (ePDCCH), which, however, is not limited thereto.

In another optional implementation manner of this embodiment, a manner for acquiring the reference signal resource configuration information includes that: the UE obtains, according to a cell identify (ID) of a cell in which the UE is located, the reference signal resource configuration information. For example, the UE may obtain, by receiving a broadcast or multicast message, a reference signal resource configuration corresponding to each cell ID, and then obtains, based on the cell ID, the reference signal resource configuration information corresponding to the cell ID.

103. Select a precoding matrix from a codebook based on the received reference signal, where a structure of the precoding matrix corresponds to the antenna port structure indicated by the antenna port configuration information.

Specifically, the selecting a precoding matrix from a codebook based on the received reference signal includes:

performing channel estimation based on the received reference signal, for example, obtaining a channel estimation value from the received reference signal by using a least square method or a minimum mean square error criterion; and selecting, by using the obtained channel estimation value, precoding from the codebook based on a predefined criterion, for example, a capacity, a throughput, or a maximum mutual information criterion. Selecting the precoding matrix by using channel estimation and the predefined criterion is a conventional technology, and details are not described herein.

In this embodiment, the structure of the precoding matrix corresponds to the antenna port structure indicated by the antenna port configuration information. That is, the structure of the precoding matrix not only relates to the quantity of antenna ports, but also relates to the antenna port structure. If the quantity of antenna ports is the same, but antenna port structures are different, corresponding structures of a precoding matrix are different. That the structure of the precoding matrix corresponds to the antenna port structure indicated by the antenna port configuration information may be that the structure of the precoding matrix corresponds to an antenna port configuration, thereby corresponding to the antenna port structure indicated by the antenna port configuration. It can be learned that the structure of the precoding matrix in this embodiment can automatically adapt to the antenna port structure, thereby improving precision of CSI feedback or reporting.

104. Report a PMI to the base station, where the PMI is used to indicate the selected precoding matrix.

After selecting the precoding matrix from the codebook, to facilitate implementation of a transmit precoding technology, the UE reports, to the base station, the PMI used to indicate the selected precoding matrix.

It is noted herein that in step 104, to the UE may report, to the base station, the PMI used to indicate the selected precoding matrix, and the UE may further report other CSI information to the base station, for example, RI and/or CQI.

In an optional implementation manner of this embodiment, a manner of reporting the CSI that includes the PMI to the base station includes that: the UE reports, by using a physical uplink control channel (PUCCH) or a physical uplink shared channel (PUSCH), the CSI that includes the PMI to the base station, which, however, is not limited thereto.

It is noted herein that, in addition to the foregoing steps, the UE may further receive a data signal sent by the base station, where the data signal is sent by the base station after the base station obtains the precoding matrix according to the PMI reported by the UE and performs precoding on the data, for example, the data signal is sent to the UE by using the PDSCH after being precoded.

The base station receives the PMI and obtains, from the codebook, the precoding matrix selected by the UE. Because the structure of the precoding matrix can automatically adapt to the antenna port structure, precision of CSI feedback or reporting is improved. The base station performs precoding on data by using the precoding matrix, and sends the precoded data to the UE, which can improve a capacity and reliability of data transmission, thereby increasing a throughput and coverage of a system. In addition, the precoding matrix that automatically adapts to different antenna port structures may form different codebooks, so that the PMI can be reported or fed back based on the foregoing antenna port configuration information for only the antenna port structure indicated by the antenna port configuration information, thereby effectively reducing an overhead of CSI reporting or feedback. In contrast, if the UE is notified of only the quantity of antenna ports, because there may be multiple antenna port structures for a same quantity of antenna ports, the precoding matrix included in the codebook may be a union set of precoding matrices of multiple antenna ports or array structures, and this mixed design leads to a larger codebook, thereby causing an excessively large overhead.

It should be noted that the antenna port structure may be an antenna array structure.

In a scenario in which an AAS base station is deployed, because degrees of freedom in a vertical direction and a horizontal direction of an antenna are both considered, an antenna array structure has more changes, and a corresponding antenna port structure also has more changes accordingly. Even if a quantity of antenna ports is the same, antenna array structures may be different; therefore, for an antenna port with a same serial number, different channel state measurements may be obtained in different array structures. However, in the method provided in this embodiment, a precoding matrix corresponding to an antenna port structure is acquired, and a PMI used to indicate the selected precoding matrix is reported to a base station, so that the selected precoding matrix can automatically adapt to an antenna array structure or the antenna port structure, thereby improving precision of CSI reporting or feedback, reducing an overhead of the CSI reporting and feedback, increasing a capacity or a throughput of data transmission, and increasing a capacity and coverage of a system. The method is applicable to the scenario in which an AAS base station is deployed, and resolves a problem of CSI reporting in the AAS base station scenario.

Figure 1B:
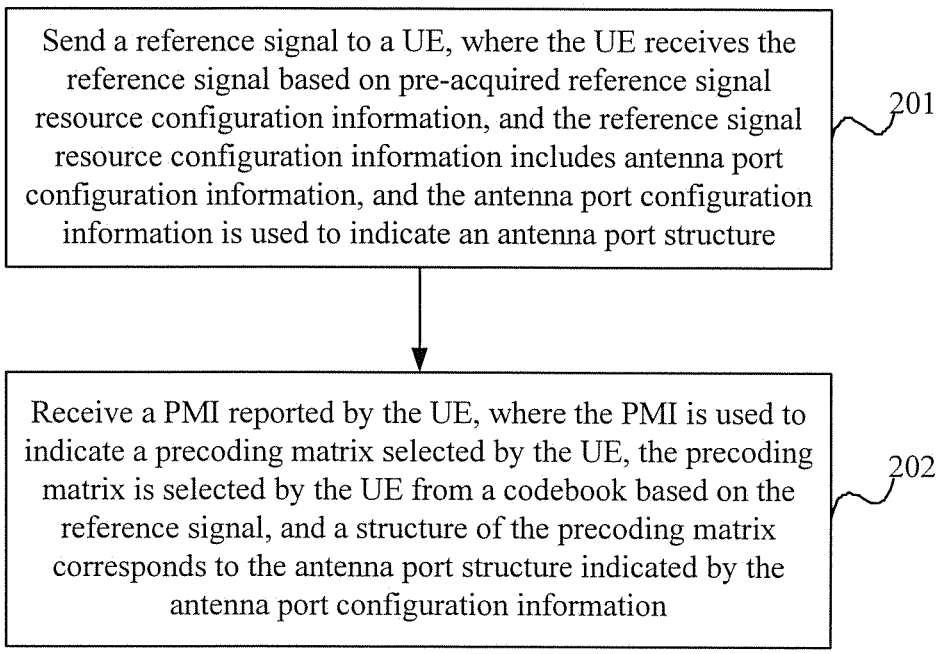
FIG. 1b is a flowchart of a method for receiving channel state information according to an embodiment of the present invention.

FIG. 1b is a flowchart of a method for receiving channel state information according to an embodiment of the present invention. As shown in FIG. 1b, the method includes the following steps:

201. Send a reference signal to a UE, where the UE receives the reference signal based on pre-acquired reference signal resource configuration information, the reference signal resource configuration information includes antenna port configuration information, and the antenna port configuration information is used to indicate an antenna port structure.

In this embodiment, to receive the reference signal sent by a base station, the UE first acquires the reference signal resource configuration information, and then receives, based on the reference signal resource configuration information, the reference signal sent by the base station. It is noted herein that a quantity of reference signals sent by the base station is the same as a quantity of antenna ports, where the quantity of antenna ports is indicated by the antenna port configuration information.

In this embodiment, in addition to the antenna port configuration information, the reference signal resource configuration information further includes an RE occupied by the reference signal, a subframe configuration, for example, a subframe period and a subframe offset of the reference signal, that corresponds to the reference signal, and the like. The UE specifically receives, on a subframe and the resource element that are indicated by the reference signal resource configuration information, the reference signal sent by the base station.

In an optional implementation manner, before sending the reference signal to the UE, the base station sends the reference signal resource configuration information to the UE by using higher layer signaling or dynamic signaling. The higher layer signaling may be RRC signaling or MAC layer signaling, which, however, is not limited thereto. The dynamic signaling may be DCI that is sent by using a PDCCH or an ePDCCH, which, however, is not limited thereto.

In addition to receiving the reference signal resource configuration information sent by the base station, the UE may further obtain the reference signal resource configuration information according to a cell identity (ID) of a cell in which the UE is located. The base station may notify, in a broadcast or multicast manner, the UE of a reference signal resource configuration corresponding to each cell ID.

202. Receive a PMI reported by the UE, where the PMI is used to indicate a precoding matrix selected by the UE, the precoding matrix is selected by the UE based on the reference signal from a codebook, and a structure of the precoding matrix corresponds to an antenna port structure indicated by the antenna port configuration information. That the structure of the precoding matrix corresponds to the antenna port structure indicated by the antenna port configuration information may be that the structure of the precoding matrix corresponds to an antenna port configuration, thereby corresponding to the antenna port structure indicated by the antenna port configuration.

After sending the reference signal to the UE, the base station waits for the PMI reported by the UE. After receiving the reference signal, the UE selects one precoding matrix from the codebook based on the received reference signal. Specifically, the UE performs channel estimation based on the received reference signal, for example, the UE may obtain a channel estimation value from the received reference signaling by using a least square method or a minimum mean square error criterion; and then the UE may select, based on a predefined criterion, for example, a capacity, a throughput, or a maximum mutual information criterion, precoding from the codebook by using the obtained channel estimation value. Selecting the precoding matrix by using channel estimation and the predefined criterion is a conventional technology, and details are not described herein.

After selecting the precoding matrix, the UE sends the PMI that is used to indicate the selected precoding matrix to the base station. The base station receives the PMI reported by the UE.

It is noted herein that in step 202, the base station may receive the PMI that is reported by the UE and is used to indicate the selected precoding matrix, and the base station may further receive other CSI information, for example, RI and/or CQI.

In an optional implementation manner of this embodiment, a manner in which the base station receives CSI that includes the PMI and is reported by the UE includes that: the base station receives the CSI that includes the PMI and is reported by the UE by using a physical uplink control channel (PUCCH) or a physical uplink shared channel (PUSCH), which, however, is not limited thereto.

It is noted herein that in addition to the foregoing steps, the base station may further obtain the precoding matrix according to the PMI reported by the UE, perform, by using the obtained precoding matrix, precoding on data to be sent to the UE, and send the precoded data for example, the data signal is sent to the UE by using the PDSCH after being precoded.

The base station receives the PMI and obtains, from the codebook, the precoding matrix selected by the UE. Because the structure of the precoding matrix can automatically adapt to the antenna port structure, precision of CSI feedback or reporting is improved. The base station performs precoding on data by using the precoding matrix, and sends the data to the UE, which can improve a capacity and reliability of data transmission, thereby increasing a throughput and coverage of a system. In addition, the precoding matrix that automatically adapts to different antenna port structures may form different codebooks, so that the PMI can be reported or fed back based on the foregoing antenna port configuration information for only the antenna port structure indicated by the antenna port configuration information, thereby effectively reducing an overhead of CSI reporting or feedback.

It should be noted that the antenna port structure may be an antenna array structure.

In this embodiment, the antenna port structure indicated by the antenna port configuration information provides more antenna port information in addition to the quantity of antenna ports. The structure of the precoding matrix selected by the UE corresponds to the antenna port structure indicated by the antenna port configuration information. That is, the structure of the precoding matrix selected by the UE not only relates to the quantity of antenna ports, but also relates to the antenna port structure. If the quantity of antenna ports is the same, but antenna port structures are different, corresponding structures of a precoding matrix are different. That the structure of the precoding matrix corresponds to the antenna port structure indicated by the antenna port configuration information may be that the structure of the precoding matrix corresponds to an antenna port configuration, thereby corresponding to the antenna port structure indicated by the antenna port configuration. It can be learned that the structure of the precoding matrix in this embodiment can automatically adapt to the antenna port structure, thereby improving precision of CSI feedback or reporting.

In this embodiment, more information about an antenna port structure is provided, and a structure of a precoding matrix corresponds to an antenna port structure indicated by antenna port configuration information. This feature ensures that, in a process of CSI measurement and reporting, degrees of freedom in a horizontal direction and a vertical direction of an antenna of an AAS base station are both considered, so that precision of CSI reporting can be improved or an overhead of feedback can be reduced. The base station performs precoding on data by using the precoding matrix, and sends the data to the UE, which can improve a capacity and reliability of data transmission, thereby increasing a throughput and coverage of a system. The method is applicable to a scenario in which an antenna of an AAS base station is deployed, and resolves a problem of CSI reporting in an AAS base station scenario.

The following embodiments of the present invention describe in detail the precoding matrix and the antenna port structure in the technical solutions of the present invention by using a scenario in which an AAS base station is deployed as an example.

Generally, a reference signal usually corresponds to a physical antenna or a virtual antenna, where the virtual antenna may be obtained by using a weighted combination of multiple physical antennas. Actual antenna deployment may have different antenna configurations and antenna array forms. As shown in FIG. 2b, an antenna array B is a uniform linear array with two rows and eight columns. As shown in FIG. 2c, an antenna array C is a uniform linear array with four rows and four columns. Although the antenna array B and the array C both have 16 antenna ports, array forms of the antenna array B and the array C are different. As shown in FIG. 3b, an antenna array E is a cross polarization antenna array with two rows and four columns. As shown in FIG. 3c, an antenna F is a cross polarization antenna array with four rows and two columns. Different polarization antennas may be disposed in a same column. Although the antenna array E and the antenna array F both have 16 antenna ports, antenna forms of the antenna array E and the antenna array F are also different. Different antenna arrays correspond to different antenna port structures, and an antenna port structure corresponds to an antenna array structure in a one to one manner. As shown in FIG. 2b and FIG. 2c, antenna port structures are respectively 2×8 and 4×4.

Optionally, the antenna port configuration information in this embodiment of the present invention includes an index m and an index n, where the index m corresponds to a quantity of rows in an antenna port structure, that is, a quantity of rows in an antenna array structure corresponding to the antenna port structure, and the index n corresponds to a quantity of columns in an antenna port structure, that is, a quantity of columns in an antenna array structure corresponding to the antenna port structure. A product of the index m and the index n is a quantity of antenna ports N.

Figure 2A:
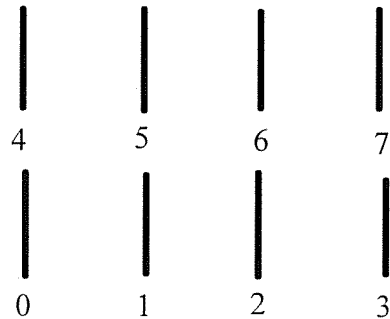
FIG. 2a to FIG. 2c are schematic structural diagrams of uniform linear arrays according to an embodiment of the present invention.
Figure 2B:
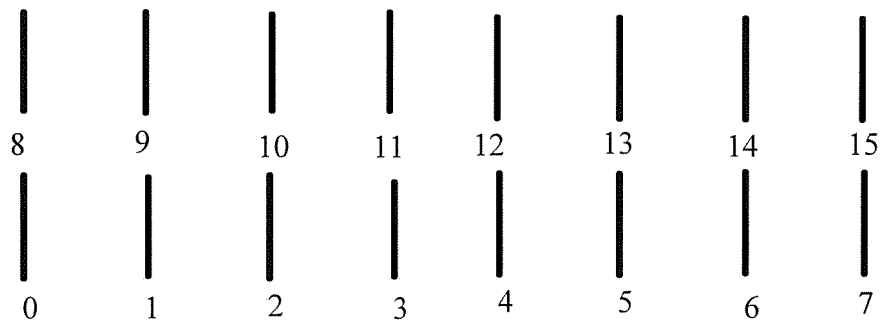
Figure 2C:
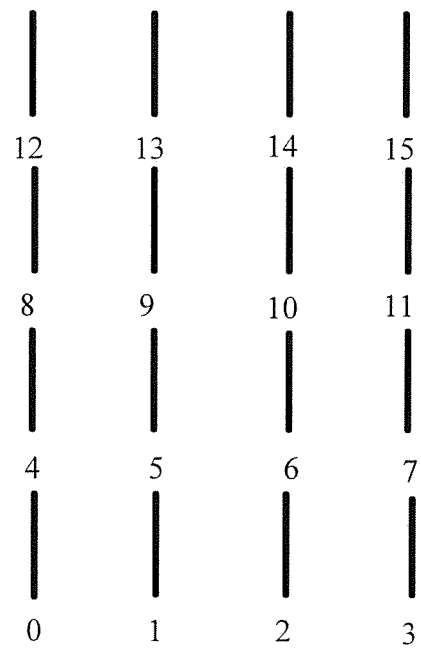
Figure 3A:
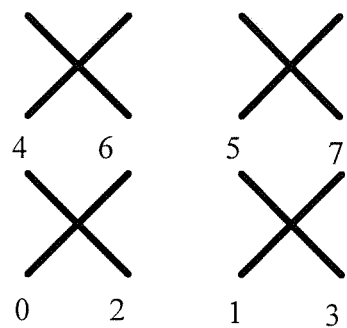
FIG. 3a to FIG. 3c are schematic structural diagrams of cross polarization antenna arrays according to an embodiment of the present invention.
Figure 3B:
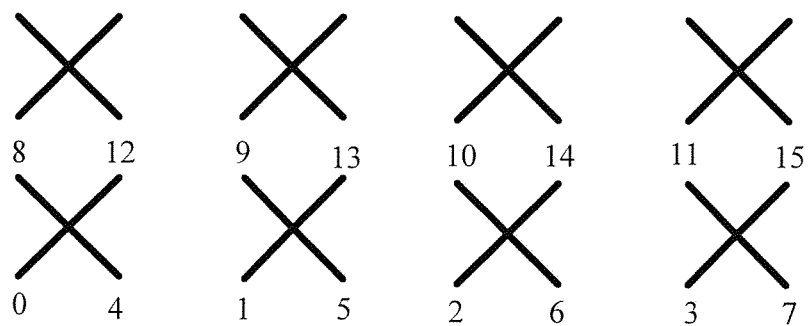
Figure 3C:
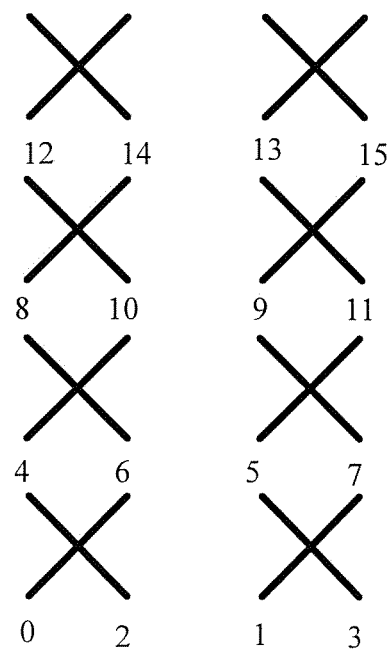

Uniform linear arrays shown in FIG. 2a to FIG. 2c are used as an example, and indexes corresponding to the antenna arrays A, B, and C are respectively (m, n)=(2, 4), (m, n)=(2, 8), (m, n)=(4, 4). Cross polarization antenna arrays shown in FIG. 3a to FIG. 3c are used as an example, and indexes corresponding to the antenna arrays D, E, F are respectively (m, n)=(2, 4), (m, n)=(2, 8), (m, n)=(4, 4); where two groups of antennas of different polarization may be disposed in a position of a same column. For example, the antenna array D is used as an example. (0, 1, 4, 5) is a co-polarization antenna group with 45° polarization; (2, 3, 6, 7) is a co-polarization antenna group with −45° polarization; 0 and 2 are disposed in a same position, 1 and 3 are disposed in a same position, 4 and 6 are disposed in a same position, and 5 and 7 are disposed in same position, so that antenna ports 0, 2, 4 and 6 are in a same column; antenna ports 1, 3, 5 and 7 are in a same column. The antenna arrays E and F may be deduced from this.

Based on the foregoing antenna port configuration, one structure of the precoding matrix in this embodiment of the present invention may be $W=W_1 W_2$, where W is the precoding matrix, and $W_1$ and $W_2$ are matrices; in this embodiment of the present invention, specific meanings of the matrices $W_1$ and $W_2$ are not limited.

Optionally, $$W_1 = \begin{bmatrix} X & 0 \\ 0 & X \end{bmatrix},$$

and X=A⊗B, where ⊗ indicates a Kronecker product, and A and B are matrices of m×p and (n/2)×q respectively. Specifically, 16 antennas are used as an example; an array structure is expressed as m=2, n=8, and A and B are matrices of 2×p and 4×q respectively. 16 antennas are used as an example; an array structure is expressed as m=4, n=4, and A and B are matrices of 4×p and 2×q respectively, where p and q are positive integers. Correspondingly, $W_2$ is a matrix of (pq)×r, and r is a rank of the precoding matrix W.

Alternatively, $$W_1 = \begin{bmatrix} X & 0 \\ 0 & X \end{bmatrix},$$

and X=A⊗B, where ⊗ indicates a Kronecker product, and A and B are matrices of (m/2)×p and n×q respectively. Specifically, 16 antennas are used as an example; an array structure is expressed as m=4, n=8, and A and B are matrices of 2×p and 8×q respectively. 16 antennas are used as an example; an array structure is expressed as m=4, n=4, and A and B are matrices of 2×p and 4×q respectively, where p and q are positive integers. Correspondingly, $W_2$ is a matrix of (pq)×r, and r is a rank of the precoding matrix W.

In an optional implementation manner, $W_1$=A⊗B, where ⊗ indicates a Kronecker product, and A and B are matrices of m×p and n×q respectively. Specifically, 16 antennas are used as an example; an array structure is expressed as m=2, n=8, and A and B are matrices of 2×p and 8×q respectively. 16 antennas are used as an example; an array structure is expressed as m=4, n=4, and A and B are matrices of 4×p and 4×q respectively, where p and q are integers. Correspondingly, $W_2$ is a matrix of (pq)×r, and r is a rank of the precoding matrix W.

Alternatively, $W_1$=A⊗B, where ⊗ indicates a Kronecker product, or A and B are matrices of n×p and m×q respectively. Specifically, 16 antennas are used as an example; an array structure is expressed as m=2, n=8, and A and B are matrices of 8×p and 2×q respectively. 16 antennas are used as an example; an array structure is expressed as m=4, n=4, and A and B are matrices of 4×p and 2×q respectively, where p and q are integers. Correspondingly, $W_2$ is a matrix of (pq)×r, and r is a rank of the precoding matrix W.

Based on the foregoing implementation manners, the PMI reported by the UE to the base station may include a first PMI and a second PMI. The first PMI is used to indicate the matrix $W_1$, and the second PMI is used to indicate the matrix $W_2$. Based on this, that the UE reports the PMI to the base station includes that: the UE separately reports the first PMI and the second PMI to the base station. In this implementation manner, a difference of meanings identified by the matrix $W_1$ and the matrix $W_2$ may be considered, so that corresponding PMIs are separately reported to the base station, and times, a frequency interval, and the like of reporting the first PMI and the second PMI are allowed to be different, which helps reduce an overhead of feedback.

Figure 4:
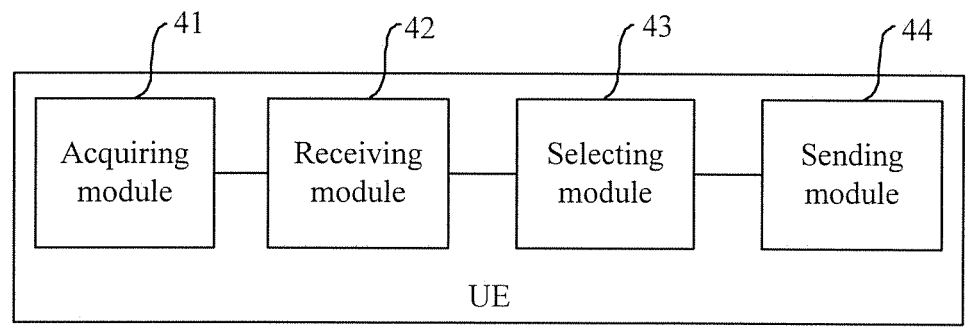
FIG. 4 is a schematic structural diagram of a UE according to an embodiment of the present invention.

FIG. 4 is a schematic structural diagram of a UE according to an embodiment of the present invention. As shown in FIG. 4, the UE includes: an acquiring module 41, a receiving module 42, a selecting module 43, and a sending module 44.

The acquiring module 41 is configured to acquire reference signal resource configuration information, where the reference signal resource configuration information includes antenna port configuration information, and the antenna port configuration information is used to indicate an antenna port structure.

The receiving module 42 is connected to the acquiring module 41, and is configured to receive, according to the reference signal resource configuration information acquired by the acquiring module 41, a reference signal sent by a base station.

The selecting module 43 is connected to the receiving module 42, and is configured to select a precoding matrix from a codebook based on the reference signal received by the receiving module 42, where a structure of the precoding matrix corresponds to the antenna port structure indicated by the antenna port configuration information.

The sending module 44 is connected to the selecting module 43, and is configured to report a PMI to the base station, where the PMI is used to indicate the precoding matrix selected by the selecting module 43.

In an optional implementation manner, the acquiring module 41 is specifically configured to receive the reference signal resource configuration information sent by the base station by using higher layer signaling or dynamic signaling. The higher layer signaling may be RRC signaling or MAC layer signaling, which, however, is not limited thereto. The dynamic signaling may be DCI that is sent by using a PDCCH or an ePDCCH, which, however, is not limited thereto.

In an optional implementation manner, the acquiring module 41 is specifically configured to obtain the reference signal resource configuration information according to a cell identity (ID) of a cell in which the UE is located.

In an optional implementation manner, the antenna port configuration information includes an index m and an index n. The index m corresponds to a quantity of rows in the antenna port structure, that is, a quantity of rows in an antenna array structure corresponding to the antenna port structure; the index n corresponds to a quantity of columns in the antenna port structure, that is, a quantity of columns in an antenna array structure corresponding to the antenna port structure. A product of the index m and the index n is a quantity of antenna ports N.

Based on the foregoing description, one structure of the precoding matrix in this embodiment may be W=$W_1W_2$, where W is the precoding matrix, and $W_1$ and $W_2$ are matrices. In this embodiment of the present invention, specific meanings of the matrices $W_1$ and $W_2$ are not limited.

Optionally, $$W_1 = \begin{bmatrix} X & 0 \\ 0 & X \end{bmatrix},$$

and X=A⊗B, where ⊗ indicates a Kronecker product, and A and B are matrices of m×p and (n/2)×q respectively.

Specifically, 16 antennas are used as an example; an array structure is expressed as m=2, n=8, and A and B are matrices of 2×p and 4×q respectively. 16 antennas are used as an example; an array structure is expressed as m=4, n=4, and A and B are matrices of 4×p and 2×q respectively, where p and q are positive integers. Correspondingly, $W_2$ is a matrix of (pq)×r, and r is a rank of the precoding matrix W.

Alternatively, $$W_1 = \begin{bmatrix} X & 0 \\ 0 & X \end{bmatrix},$$

and X=A⊗B, where ⊗ indicates a Kronecker product, and A and B are matrices of (m/2)×p and n×q respectively. Specifically, 16 antennas are used as an example; an array structure is expressed as m=4, n=8, and A and B are matrices of 2×p and 8×q respectively. 16 antennas are used as an example; an array structure is expressed as m=4, n=4, and A and B are matrices of 2×p and 4×q respectively, where p and q are positive integers. Correspondingly, $W_2$ is a matrix of (pq)×r, and r is a rank of the precoding matrix W.

In an optional implementation manner, $W_1$=A⊗B, where ⊗ indicates a Kronecker product, and A and B are matrices of m×p and n×q respectively. Specifically, 16 antennas are used as an example; an array structure is expressed as m=2, n=8, and A and B are matrices of 2×p and 8×q respectively. 16 antennas are used as an example; an array structure is expressed as m=4, n=4, and A and B are matrices of 4×p and 4×q respectively, where p and q are integers. Correspondingly, $W_2$ is a matrix of (pq)×r, and r is a rank of the precoding matrix W.

Alternatively, $W_1$=A⊗B, where ⊗ indicates a Kronecker product, or A and B are matrices of n×p and m×q respectively. Specifically, 16 antennas are used as an example; an array structure is expressed as m=2, n=8, and A and B are matrices of 8×p and 2×q respectively. 16 antennas are used as an example; an array structure is expressed as m=4, n=4, and A and B are matrices of 4×p and 2×q respectively, where p and q are integers. Correspondingly, $W_2$ is a matrix of (pq)×r, and r is a rank of the precoding matrix W.

Based on the foregoing implementation manners, the PMI reported by the sending module 44 to the base station may include a first PMI and a second PMI. The first PMI is used to indicate the matrix $W_1$, and the second PMI is used to indicate the matrix $W_2$. Based on this, the sending module 44 is specifically configured to separately send the first PMI and the second PMI to the base station. In this implementation manner, a difference of meanings identified by the matrix $W_1$ and the matrix $W_2$ may be considered, so that corresponding PMIs are separately reported to the base station, and times, a frequency interval, and the like of reporting the first PMI and the second PMI are allowed to be different, which helps reduce an overhead of feedback, thereby improving a system throughput.

The UE provided in this embodiment acquires reference signal resource configuration information that includes antenna port configuration information, receives, according to the reference signal resource configuration information, a reference signal sent by a base station, selects a precoding matrix from a codebook based on the received reference signal, and reports, to the base station, a PMI used to indicate the selected precoding matrix, where the antenna port configuration information indicates an antenna port structure, and a structure of the precoding matrix corresponds to the antenna port structure. More information about the antenna port structure is provided, and the structure of the precoding matrix corresponds to the antenna port structure indicated by the antenna port configuration information. This feature ensures that, in a process of CSI measurement and reporting, degrees of freedom in a horizontal direction and a vertical direction of an antenna of an AAS base station are both considered, so that precision of CSI reporting or feedback can be improved, an overhead of CSI reporting or feedback is reduced, and a capacity or a throughput of data transmission is increased, thereby increasing a capacity and coverage of a system. The UE is applicable to a scenario in which an antenna of an AAS base station is deployed, and resolves a problem of CSI reporting in an AAS base station scenario.

Figure 5:
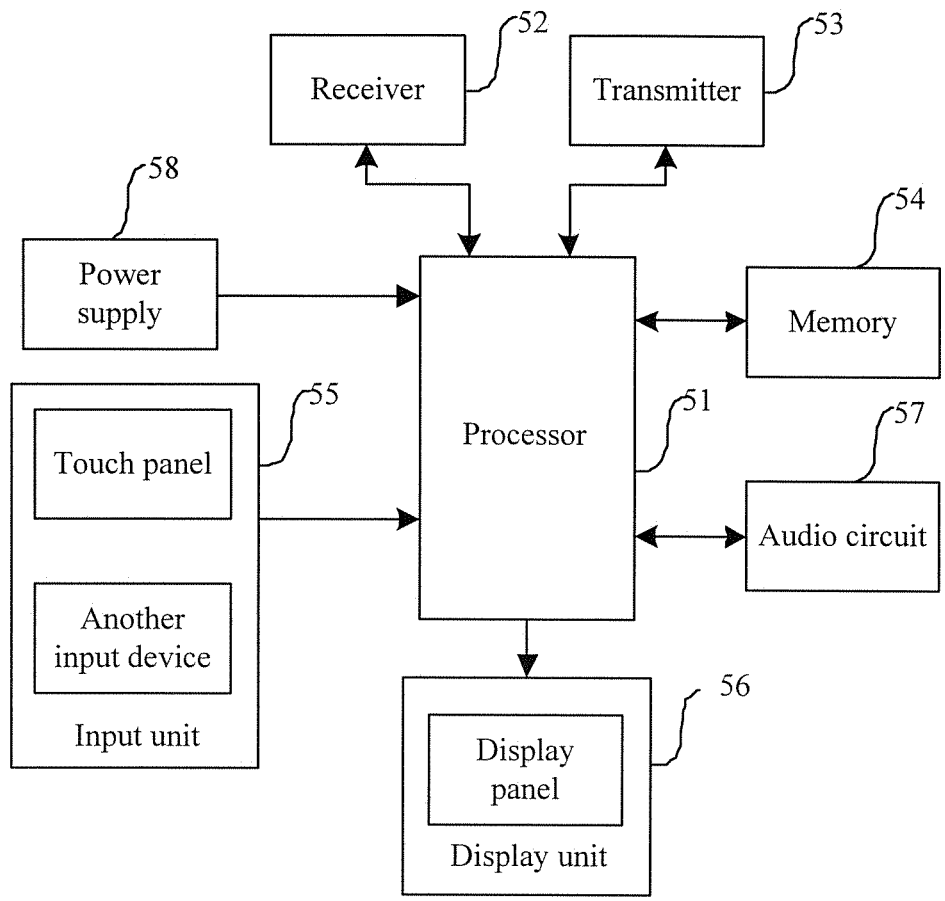
FIG. 5 is a schematic structural diagram of another UE according to an embodiment of the present invention.

FIG. 5 is a schematic structural diagram of another UE according to an embodiment of the present invention. As shown in FIG. 5, the UE includes: a processor 51, a receiver 52, and a transmitter 53.

The processor 51 is configured to acquire reference signal resource configuration information, where the reference signal resource configuration information includes antenna port configuration information, and the antenna port configuration information is used to indicate an antenna port structure; and configured to select a precoding matrix from a codebook based on a reference signal received by the receiver 52, where a structure of the precoding matrix corresponds to the antenna port structure indicated by the antenna port configuration information.

The processor 51 may be a central processing unit (CPU), or an application specific integrated circuit (ASIC), or one or more integrated circuits configured to implement this embodiment of the present invention.

The receiver 52 is configured to receive, according to the reference signal resource configuration information acquired by the processor 51, the reference signal sent by a base station.

The transmitter 53 is configured to report a PMI to the base station, where the PMI is used to indicate the precoding matrix selected by the processor 51.

In an optional implementation manner, the processor 51 may be specifically configured to control the receiver 52 to receive the reference signal resource configuration information sent by the base station by using higher layer signaling or dynamic signaling. The higher layer signaling may be RRC signaling or MAC layer signaling, which, however, is not limited thereto. The dynamic signaling may be DCI that is sent by using a PDCCH or an ePDCCH, which, however, is not limited thereto.

In an optional implementation manner, the processor 51 may be specifically configured to obtain the reference signal resource configuration information according to a cell identity (ID) of a cell in which the UE is located.

In an optional implementation manner, the antenna port configuration information includes an index m and an index n. The index m corresponds to a quantity of rows in the antenna port structure, that is, a quantity of rows in an antenna array structure corresponding to the antenna port structure; the index n corresponds to a quantity of columns in the antenna port structure, that is, a quantity of columns in an antenna array structure corresponding to the antenna port structure. A product of the index m and the index n is a quantity of antenna ports N.

Based on the foregoing description, one structure of the precoding matrix in this embodiment may be W=$W_1W_2$ where W is the precoding matrix, and $W_1$ and $W_2$ are matrices. In this embodiment of the present invention, specific meanings of the matrices $W_1$ and $W_2$ are not limited.

Optionally, $$W_1 = \begin{bmatrix} X & 0 \\ 0 & X \end{bmatrix},$$

and X=A⊗B, where ⊗ indicates a Kronecker product, and A and B are matrices of m×p and (n/2)×q respectively. Specifically, 16 antennas are used as an example; an array structure is expressed as m=2, n=8, and A and B are matrices of 2×p and 4×q respectively. 16 antennas are used as an example; an array structure is expressed as m=4, n=4, and A and B are matrices of 4×p and 2×q respectively, where p and q are positive integers. Correspondingly, $W_2$ is a matrix of (pq)×r, and r is a rank of the precoding matrix W.

Alternatively, $$W_1 = \begin{bmatrix} X & 0 \\ 0 & X \end{bmatrix},$$

and X=A⊗B, where ⊗ indicates a Kronecker product, and A and B are matrices of (m/2)×p and n×q respectively. Specifically, 16 antennas are used as an example; an array structure is expressed as m=4, n=8, and A and B are matrices of 2×p and 8×q respectively. 16 antennas are used as an example; an array structure is expressed as m=4, n=4, and A and B are matrices of 2×p and 4×q respectively, where p and q are positive integers. Correspondingly, $W_2$ is a matrix of (pq)×r, and r is a rank of the precoding matrix W.

In an optional implementation manner, $W_1$=A⊗B, where ⊗ indicates a Kronecker product, and A and B are matrices of m×p and n×q respectively. Specifically, 16 antennas are used as an example; an array structure is expressed as m=2, n=8, and A and B are matrices of 2×p and 8×q respectively. 16 antennas are used as an example; an array structure is expressed as m=4, n=4, and A and B are matrices of 4×p and 4×q respectively, where p and q are integers. Correspondingly, $W_2$ is a matrix of (pq)×r, and r is a rank of the precoding matrix W.

Alternatively, $W_1$=A⊗B, where ⊗ indicates a Kronecker product, or A and B are matrices of n×p and m×q respectively. Specifically, 16 antennas are used as an example; an array structure is expressed as m=2, n=8, and A and B are matrices of 8×p and 2×q respectively. 16 antennas are used as an example; an array structure is expressed as m=4, n=4, and A and B are matrices of 4×p and 2×q respectively, where p and q are integers. Correspondingly, $W_2$ is a matrix of (pq)×r, and r is a rank of the precoding matrix W.

Based on the foregoing implementation manners, the PMI reported by the transmitter 53 to the base station may include a first PMI and a second PMI. The first PMI is used to indicate the matrix $W_1$, and the second PMI is used to indicate the matrix $W_2$. Based on this, the transmitter 53 may be specifically configured to separately report the first PMI and the second PMI to the base station. In this implementation manner, a difference of meanings identified by the matrix $W_1$ and the matrix $W_2$ may be considered, so that corresponding PMIs are separately reported to the base station, and times, a frequency interval, and the like of reporting the first PMI and the second PMI are allowed to be different, which helps reduce an overhead of feedback, thereby improving a system throughput.

Further, as shown in FIG. 5, the UE may further include a memory 54. The memory 54 is configured to store a program. Specifically, the program may include program code, where the program code includes a computer operation instruction. Optionally, the processor 51 may be specifically configured to execute the program stored in the memory 54 to implement the forgoing function.

The memory 54 may include a high-speed RAM memory, and may also include a non-volatile memory, for example, at least one disk storage.

In an implementation, the receiver 52 and the transmitter 53 may be implemented by using various communications modules of the UE, which may be, for example, a radio frequency (RF) module, a WiFi module, and the like.

Further, as shown in FIG. 5, the UE further includes: an input unit 55, a display unit 56, an audio circuit 57, a power supply 58, and the like. The input unit 55, the display unit 56, the audio circuit 57, and the power supply 58 are separately connected to the processor 51. The power supply 58 is mainly configured to supply power to the processor 51, and may further supply power to another module. Therefore, in addition to being connected to the processor 51, the power supply 58 may further be connected to another module (not shown in FIG. 5). The input unit 55 may include a touch panel or another input device; the display unit 56 may include a display panel, and the like.

The UE provided in this embodiment acquires reference signal resource configuration information that includes antenna port configuration information, receives, according to the reference signal resource configuration information, a reference signal sent by a base station, selects a precoding matrix from a codebook based on the received reference signal, and reports, to the base station, a PMI used to indicate the selected precoding matrix, where the antenna port configuration information indicates an antenna port structure, and a structure of the precoding matrix corresponds to the antenna port structure. More information about the antenna port structure is provided, and the structure of the precoding matrix corresponds to the antenna port structure indicated by the antenna port configuration information. This feature ensures that, in a process of CSI measurement and reporting, degrees of freedom in a horizontal direction and a vertical direction of an antenna of an AAS base station are both considered, so that precision of CSI reporting or feedback can be improved, an overhead of CSI reporting or feedback is reduced, and a capacity or a throughput of data transmission is increased, thereby increasing a capacity and coverage of a system. The UE is applicable to a scenario in which an antenna of an AAS base station is deployed, and resolves a problem of CSI reporting in an AAS base station scenario.

Figure 6:
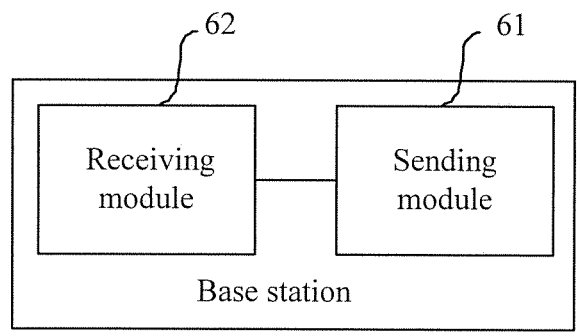
FIG. 6 is a schematic structural diagram of a base station according to an embodiment of the present invention.

FIG. 6 is a schematic structural diagram of a base station according to an embodiment of the present invention. As shown in FIG. 6, the base station includes: a sending module 61 and a receiving module 62.

The sending module 61 is configured to send a reference signal to a UE, where the UE receives the reference signal based on pre-acquired reference signal resource configuration information, the reference signal resource configuration information includes antenna port configuration information, and the antenna port configuration information is used to indicate an antenna port structure.

The receiving module 62 is configured to receive a PMI reported by the UE, where the PMI is used to indicate a precoding matrix selected by the UE, the precoding matrix is selected by the UE from a codebook based on the reference signal, and a structure of the precoding matrix corresponds to the antenna port structure indicated by the antenna port configuration information.

In an optional implementation manner, the sending module 61 is further configured to send the reference signal resource configuration information to the UE by using higher layer signaling or dynamic signaling. The higher layer signaling may be RRC signaling or MAC layer signaling, which, however, is not limited thereto. The dynamic signaling may be DCI that is sent by using a PDCCH or an ePDCCH, which, however, is not limited thereto.

In an optional implementation manner, the antenna port configuration information includes an index m and an index n. The index m corresponds to a quantity of rows in the antenna port structure, that is, a quantity of rows in an antenna array structure corresponding to the antenna port structure; the index n corresponds to a quantity of columns in the antenna port structure, that is, a quantity of columns in an antenna array structure corresponding to the antenna port structure. A product of the index m and the index n is a quantity of antenna ports N.

Based on the foregoing description, one structure of the precoding matrix in this embodiment may be $W=W_1W_2$, where W is the precoding matrix, and $W_1$ and $W_2$ are matrices; in this embodiment of the present invention, specific meanings of the matrices $W_1$ and $W_2$ are not limited.

Optionally, $$W_1 = \begin{bmatrix} X & 0 \\ 0 & X \end{bmatrix},$$

and $X=A\otimes B$, where $\otimes$ indicates a Kronecker product, and A and B are matrices of m×p and (n/2)×q respectively. Specifically, 16 antennas are used as an example; an array structure is expressed as m=2, n=8, and A and B are matrices of 2×p and 4×q respectively. 16 antennas are used as an example; an array structure is expressed as m=4, n=4, and A and B are matrices of 4×p and 2×q respectively, where p and q are positive integers. Correspondingly, $W_2$ is a matrix of (pq)×r, and r is a rank of the precoding matrix W.

Alternatively, $$W_1 = \begin{bmatrix} X & 0 \\ 0 & X \end{bmatrix},$$

and $X=A\otimes B$, where $\otimes$ indicates a Kronecker product, and A and B are matrices of (m/2)×p and n×q respectively. Specifically, 16 antennas are used as an example; an array structure is expressed as m=4, n=8, and A and B are matrices of 2×p and 8×q respectively. 16 antennas are used as an example; an array structure is expressed as m=4, n=4, and A and B are matrices of 2×p and 4×q respectively, where p and q are positive integers. Correspondingly, $W_2$ is a matrix of (pq)×r, and r is a rank of the precoding matrix W.

In an optional implementation manner, $W_1=A\otimes B$, where $\otimes$ indicates a Kronecker product, and A and B are matrices of m×p and n×q respectively. Specifically, 16 antennas are used as an example; an array structure is expressed as m=2, n=8, and A and B are matrices of 2×p and 8×q respectively. 16 antennas are used as an example; an array structure is expressed as m=4, n=4, and A and B are matrices of 4×p and 4×q respectively, where p and q are integers. Correspondingly, $W_2$ is a matrix of (pq)×r, and r is a rank of the precoding matrix W.

Alternatively, $W_1=A\otimes B$, where $\otimes$ indicates a Kronecker product, or A and B are matrices of n×p and m×q respectively. Specifically, 16 antennas are used as an example; an array structure is expressed as m=2, n=8, and A and B are matrices of 8×p and 2×q respectively. 16 antennas are used as an example; an array structure is expressed as m=4, n=4, and A and B are matrices of 4×p and 2×q respectively, where p and q are integers. Correspondingly, $W_2$ is a matrix of (pq)×r, and r is a rank of the precoding matrix W.

Based on the foregoing implementation manners, the PMI received by the receiving module 62 may include a first PMI and a second PMI. The first PMI is used to indicate the matrix $W_1$, and the second PMI is used to indicate the matrix $W_2$. Based on this, the receiving module 62 is specifically configured to separately receive the first PMI and the second PMI that are reported by the UE. In this implementation manner, a difference of meanings identified by the matrix $W_1$ and the matrix $W_2$ may be considered, so that the base station receives the PMIs that are separately reported by the UE, and times, a frequency interval, and the like of reporting the first PMI and the second PMI are allowed to be different, which helps reduce an overhead of CSI reporting and feedback, thereby improving a system throughput.

After sending a reference signal to a UE, the base station provided in this embodiment receives a PMI that is reported by the UE and is used to indicate a precoding matrix whose structure corresponds to an antenna port structure indicated by antenna port configuration information. This ensures that, in a process of CSI measurement and reporting, degrees of freedom in a horizontal direction and a vertical direction of an antenna of an AAS base station are both considered, so that precision of CSI reporting or feedback can be improved, an overhead of CSI reporting or feedback is reduced, and a capacity or a throughput of data transmission is increased, thereby increasing a capacity and coverage of a system. The base station is applicable to a scenario in which an antenna of an AAS base station is deployed, and resolves a problem of CSI reporting in an AAS base station scenario.

Figure 7:
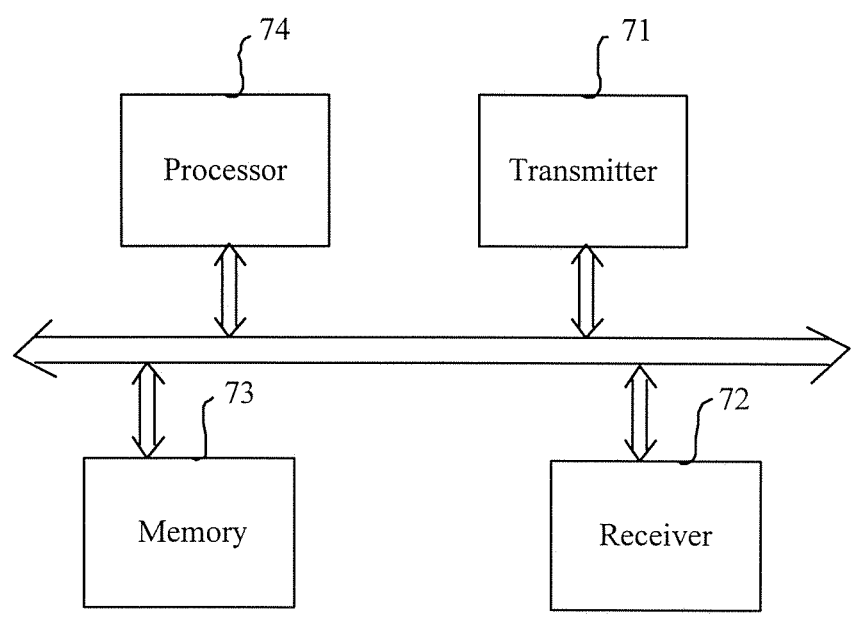
FIG. 7 is a schematic structural diagram of another base station according to an embodiment of the present invention.

FIG. 7 is a schematic structural diagram of another base station according to an embodiment of the present invention. As shown in FIG. 7, the base station includes: a transmitter 71 and a receiver 72.

The transmitter 71 is configured to send a reference signal to a UE, where the UE receives the reference signal based on pre-acquired reference signal resource configuration information, the reference signal resource configuration information includes antenna port configuration information, and the antenna port configuration information is used to indicate an antenna port structure.

The receiver 72 is configured to receive a PMI reported by the UE, where the PMI is used to indicate a precoding matrix selected by the UE, the precoding matrix is selected by the UE from a codebook based on the reference signal, and a structure of the precoding matrix corresponds to the antenna port structure indicated by the antenna port configuration information.

In an optional implementation manner, the transmitter 71 is further configured to send the reference signal resource configuration information to the UE by using higher layer signaling or dynamic signaling. The higher layer signaling may be RRC signaling or MAC layer signaling, which, however, is not limited thereto. The dynamic signaling may be DCI that is sent by using a PDCCH or an ePDCCH, which, however, is not limited thereto.

In an optional implementation manner, the antenna port configuration information includes an index m and an index n. The index m corresponds to a quantity of rows in the antenna port structure, that is, a quantity of rows in an antenna array structure corresponding to the antenna port structure; the index n corresponds to a quantity of columns in the antenna port structure, that is, a quantity of columns in an antenna array structure corresponding to the antenna port structure. A product of the index m and the index n is a quantity of antenna ports N.

Based on the foregoing description, one structure of the precoding matrix in this embodiment may be $W=W_1 W_2$, where W is the precoding matrix, and $W_1$ and $W_2$ are matrices; in this embodiment of the present invention, specific meanings of the matrices $W_1$ and $W_2$ are not limited.

Optionally, $$W_1 = \begin{bmatrix} X & 0 \\ 0 & X \end{bmatrix},$$

and $X = A \otimes B$, where $\otimes$ indicates a Kronecker product, and A and B are matrices of in $m \times B$ and $(n/2) \times q$ respectively. Specifically, 16 antennas are used as an example; an array structure is expressed as m=2, n=8, and A and B are matrices of $2 \times p$ and $4 \times q$ respectively. 16 antennas are used as an example; an array structure is expressed as m=4, n=4, and A and B are matrices of $4 \times p$ and $2 \times q$ respectively, where p and q are positive integers. Correspondingly, $W_2$ is a matrix of $(pq) \times r$, and r is a rank of the precoding matrix W.

Alternatively, $$W_1 = \begin{bmatrix} X & 0 \\ 0 & X \end{bmatrix},$$

and $X = A \otimes B$, where $\otimes$ indicates a Kronecker product, and A and B are matrices of $(m/2) \times p$ and $n \times q$ respectively. Specifically, 16 antennas are used as an example; an array structure is expressed as m=4, n=8, and A and B are matrices of $2 \times p$ and $8 \times q$ respectively. 16 antennas are used as an example; an array structure is expressed as m=4, n=4, and A and B are matrices of $2 \times p$ and $4 \times q$ respectively, where p and q are positive integers. Correspondingly, $W_2$ is a matrix of $(pq) \times r$, and r is a rank of the precoding matrix W.

In an optional implementation manner, $W_1 = A \otimes B$, where $\otimes$ indicates a Kronecker product, and A and B are matrices of $m \times p$ and $n \times q$ respectively. Specifically, 16 antennas are used as an example; an array structure is expressed as m=2, n=8, and A and B are matrices of $2 \times p$ and $8 \times q$ respectively. 16 antennas are used as an example; an array structure is expressed as m=4, n=4, and A and B are matrices of $4 \times p$ and $4 \times q$ respectively, where p and q are integers. Correspondingly, $W_2$ is a matrix of $(pq) \times r$, and r is a rank of the precoding matrix W.

Alternatively, $W_1 = A \otimes B$, where $\otimes$ indicates a Kronecker product, or A and B are matrices of $n \times p$ and $m \times q$ respectively. Specifically, 16 antennas are used as an example; an array structure is expressed as m=2, n=8, and A and B are matrices of $8 \times p$ and $2 \times q$ respectively. 16 antennas are used as an example; an array structure is expressed as m=4, n=4, and A and B are matrices of $4 \times p$ and $2 \times q$ respectively, where p and q are integers. Correspondingly, $W_2$ is a matrix of $(pq) \times r$, and r is a rank of the precoding matrix W.

Based on the foregoing implementation manners, the PMI received by the receiver 72 may include a first PMI and a second PMI. The first PMI is used to indicate the matrix $W_1$, and the second PMI is used to indicate the matrix $W_2$. Based on this, the receiver 72 may be specifically configured to separately receive the first PMI and the second PMI that are reported by the UE. In this implementation manner, a difference of meanings identified by the matrix $W_1$ and the matrix $W_2$ may be considered, so that the base station receives the PMIs that are separately reported by the UE, and times, a frequency interval, and the like of reporting the first PMI and the second PMI are allowed to be different, which helps reduce an overhead of CSI reporting and feedback, thereby improving a system throughput.

Further, as shown in FIG. 7, the base station further includes: a memory 73 and a processor 74. The memory 73 is configured to store a program. Specifically, the program may include program code, where the program code includes a computer operation instruction. The memory 73 may include a high-speed RAM memory, and may also include a non-volatile memory (non-volatile memory), for example, at least one disk storage.

The processor 74 is configured to execute the program stored in the memory 73, so as to implement control logic of the base station, and the like. The processor 74 may be a CPU, or a specific ASIC, or one or more integrated circuits that are configured to implement this embodiment of the present invention.

Optionally, in a specific implementation, if the transmitter 71, the receiver 72, the memory 73, and the processor 74 are implemented independently, the transmitter 71, the receiver 72, the memory 73, and the processor 74 may be connected to each other by using a bus and complete communication with each other. The bus may be an industry standard architecture (ISA) bus, a Peripheral Component Interconnect (PCI) bus, an Extended Industry Standard Architecture (EISA) bus, or the like. The bus may be classified into an address bus, a data bus, a control bus, and the like. For ease of denotation, the bus is indicated by using only one thick line in FIG. 7; however, it does not indicate that there is only one bus or only one type of bus.

Optionally, in a specific implementation, if the transmitter 71, the receiver 72, the memory 73, and the processor 74 are integrated into one chip for implementation, the transmitter 71, the receiver 72, the memory 73, and the processor 74 may implement communication with each other by using an internal interface.

After sending a reference signal to a UE, the base station provided in this embodiment receives a PMI that is reported by the UE and is used to indicate a precoding matrix whose structure corresponds to an antenna port structure indicated by antenna port configuration information. This ensures that, in a process of CSI measurement and reporting, degrees of freedom in a horizontal direction and a vertical direction of an antenna of an AAS base station are both considered, so that precision of CSI reporting or feedback can be improved, an overhead of CSI reporting or feedback is reduced, and a capacity or a throughput of data transmission is increased, thereby increasing a capacity and coverage of a system. The base station is applicable to a scenario in which an antenna of an AAS base station is deployed, and resolves a problem of CSI reporting in an AAS base station scenario.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for reporting channel state information, the method comprising:
   acquiring reference signal resource configuration information, wherein the reference signal resource configuration information comprises antenna port configuration information, the antenna port configuration information is used to indicate an antenna port structure;
   receiving, according to the reference signal resource configuration information, a reference signal sent by a base station;
   selecting a precoding matrix from a codebook based on the received reference signal, wherein a structure of the precoding matrix corresponds to the antenna port structure indicated by the antenna port configuration information, wherein the structure of the precoding matrix is $W=W_1W_2$, wherein $$W_1 = \begin{bmatrix} X & 0 \\ 0 & X \end{bmatrix},$$

and $X=A \otimes B$; $\otimes$ indicates a Kronecker product; A and B are matrices of $(n/2) \times p$ and $m \times q$ respectively, or A and B are matrices of $n \times p$ and $(m/2) \times q$ respectively; $W_2$ is a matrix of r columns, wherein p and q are positive integers, and r is a rank of the precoding matrix, m corresponds to a quantity of rows in the antenna port structure, and n corresponds to a quantity of columns in the antenna port structure; and
   reporting a precoding matrix indicator (PMI) to the base station, wherein the PMI is used to indicate the selected precoding matrix.

2. The method according to claim 1, wherein:
   the PMI comprises a first PMI used to indicate the matrix $W_1$ and a second PMI used to indicate the matrix $W_2$; and
   reporting the precoding matrix indicator (PMI) to the base station comprises:
   separately reporting the first PMI and the second PMI to the base station.

3. A method for receiving channel state information, the method comprising:
   sending a reference signal to user equipment based on reference signal resource configuration information, the reference signal resource configuration information comprises antenna port configuration information, the antenna port configuration information is used to indicate an antenna port structure; and
   receiving a precoding matrix indicator (PMI) reported by the user equipment, wherein the PMI is used to indicate a precoding matrix selected by the user equipment, the precoding matrix is selected by the user equipment from a codebook based on the reference signal, and a structure of the precoding matrix corresponds to the antenna port structure indicated by the antenna port configuration information, wherein the structure of the precoding matrix is $W=W_1W_2$, wherein $$W_1 = \begin{bmatrix} X & 0 \\ 0 & X \end{bmatrix},$$

and $X=A \otimes B$; $\otimes$ indicates a Kronecker product; A and B are matrices of $(n/2) \times p$ and $m \times q$ respectively, or A and B are matrices of $n \times p$ and $(m/2) \times q$ respectively; $W_2$ is a matrix of r columns, wherein p and q are positive integers, and r is a rank of the precoding matrix, m corresponds to a quantity of rows in the antenna port structure, and n corresponds to a quantity of columns in the antenna port structure.

4. The method according to claim 3, wherein:
   the PMI comprises a first PMI used to indicate the matrix $W_1$ and a second PMI used to indicate the matrix $W_2$; and
   receiving the precoding matrix indicator (PMI) reported by the user equipment comprises:
   separately receiving the first PMI and the second PMI that are reported by the user equipment.

5. User equipment, comprising:
   a processor, a receiver, and a transmitter;
   wherein the processor is configured to:
      acquire reference signal resource configuration information, wherein the reference signal resource configuration information comprises antenna port configuration information, the antenna port configuration information is used to indicate an antenna port structure; and
      select a precoding matrix from a codebook based on a reference signal received by the receiver, wherein a structure of the precoding matrix corresponds to the antenna port structure indicated by the antenna port configuration information, wherein the structure of the precoding matrix is $W=W_1W_2$, wherein $$W_1 = \begin{bmatrix} X & 0 \\ 0 & X \end{bmatrix},$$

and $X=A \otimes B$; $\otimes$ indicates a Kronecker product; A and B are matrices of $(n/2) \times p$ and $m \times q$ respectively, or A and B are matrices of $n \times p$ and $(m/2) \times q$ respectively; $W_2$ is a matrix of r columns, wherein p and q are positive integers, and r is a rank of the precoding matrix, m corresponds to a quantity of rows in the antenna port structure, and n corresponds to a quantity of columns in the antenna port structure;
   wherein the receiver is configured to receive, according to the reference signal resource configuration information acquired by the processor, the reference signal sent by a base station; and
   wherein the transmitter is configured to report a precoding matrix indicator (PMI) to the base station, wherein the PMI is used to indicate the precoding matrix selected by the processor.

6. The user equipment according to claim 5, wherein:
   the PMI comprises a first PMI used to indicate the matrix $W_1$ and a second PMI used to indicate the matrix $W_2$; and
   the transmitter is configured to separately report the first PMI and the second PMI to the base station.

7. A base station, comprising:
   a transmitter, configured to send a reference signal to user equipment based on reference signal resource configuration information, the reference signal resource configuration information comprises antenna port configuration information, the antenna port configuration information is used to indicate an antenna port structure; and
   a receiver, configured to receive a precoding matrix indicator (PMI) reported by the user equipment, wherein the PMI is used to indicate a precoding matrix selected by the user equipment, the precoding matrix is selected by the user equipment from a codebook based on the reference signal, and a structure of the precoding matrix corresponds to the antenna port structure indicated by the antenna port configuration information, wherein the structure of the precoding matrix is $W=W_1W_2$, wherein $$W_1 = \begin{bmatrix} X & 0 \\ 0 & X \end{bmatrix},$$

and $X=A \otimes B$; $\otimes$ indicates a Kronecker product; A and B are matrices of (n/2)×p and m×q respectively, or A and B are matrices of n×p and (m/2)×q respectively; $W_2$ is a matrix of r columns, wherein p and q are positive integers, and r is a rank of the precoding matrix, m corresponds to a quantity of rows in the antenna port structure, and n corresponds to a quantity of columns in the antenna port structure.

8. The base station according to claim 7, wherein:
the PMI comprises a first PMI used to indicate the matrix $W_1$ and a second PMI used to indicate the matrix $W_2$; and
the receiver is configured to separately receive the first PMI and the second PMI that are reported by the user equipment.

9. An apparatus configured to report channel state information, the apparatus comprising:
a processor; and
a memory, coupled to the processor, storing instructions that, when executed by the processor, cause the processor to:
acquire reference signal resource configuration information, wherein the reference signal resource configuration information comprises antenna port configuration information, the antenna port configuration information is used to indicate an antenna port structure,
receive, according to the reference signal resource configuration information, a reference signal sent by a base station,
select a precoding matrix from a codebook based on the received reference signal, wherein a structure of the precoding matrix corresponds to the antenna port structure indicated by the antenna port configuration information, wherein the structure of the precoding matrix is $W=W_1W_2$, wherein $$W_1 = \begin{bmatrix} X & 0 \\ 0 & X \end{bmatrix},$$

and $X=A \otimes B$; $\otimes$ indicates a Kronecker product; A and B are matrices of (n/2)×p and m×q respectively, or A and B are matrices of n×p and (m/2)×q respectively; $W_2$ is a matrix of r columns, wherein p and q are positive integers, and r is a rank of the precoding matrix, m corresponds to a quantity of rows in the antenna port structure, and n corresponds to a quantity of columns in the antenna port structure, and
report a precoding matrix indicator (PMI) to the base station, wherein the PMI is used to indicate the selected precoding matrix.

10. The apparatus of claim 9, wherein reporting the PMI to the base station comprises:
separately reporting a first PMI used to indicate the matrix $W_1$ and a second PMI used to indicate the matrix $W_2$ to the base station.

11. An apparatus configured to receive channel state information, the apparatus comprising:
a processor; and
a memory, coupled to the processor, storing instructions that, when executed by the processor, cause the processor to:
send a reference signal to user equipment based on reference signal resource configuration information, the reference signal resource configuration information comprises antenna port configuration information, the antenna port configuration information is used to indicate an antenna port structure, and
receive a precoding matrix indicator (PMI) reported by the user equipment, wherein the PMI is used to indicate a precoding matrix selected by the user equipment, the precoding matrix is selected by the user equipment from a codebook based on the reference signal, and a structure of the precoding matrix corresponds to the antenna port structure indicated by the antenna port configuration information, wherein the structure of the precoding matrix is $W=W_1W_2$, wherein $$W_1 = \begin{bmatrix} X & 0 \\ 0 & X \end{bmatrix},$$

and $X=A \otimes B$; $\otimes$ indicates a Kronecker product; A and B are matrices of (n/2)×p and m×q respectively, or A and B are matrices of n×p and (m/2)×q respectively; $W_2$ is a matrix of r columns, wherein p and q are positive integers, and r is a rank of the precoding matrix, m corresponds to a quantity of rows in the antenna port structure, and n corresponds to a quantity of columns in the antenna port structure.

12. The apparatus of claim 11, wherein receiving the PMI reported by the user equipment comprises:
separately receiving a first PMI used to indicate the matrix $W_1$ and a second PMI used to indicate the matrix $W_2$ that are reported by the user equipment.

13. A non-transitory computer readable medium storing instructions for reporting channel state information that, when executed by a processor, cause the processor to:
acquire reference signal resource configuration information, wherein the reference signal resource configuration information comprises antenna port configuration information, the antenna port configuration information is used to indicate an antenna port structure;
receive, according to the reference signal resource configuration information, a reference signal sent by a base station;
select a precoding matrix from a codebook based on the received reference signal, wherein a structure of the precoding matrix corresponds to the antenna port structure indicated by the antenna port configuration information, wherein the structure of the precoding matrix is $W=W_1W_2$, wherein $$W_1 = \begin{bmatrix} X & 0 \\ 0 & X \end{bmatrix},$$

and X=A⊗B; ⊗ indicates a Kronecker product; A and B are matrices of (n/2)×p and m×q respectively, or A and B are matrices of n×p and (m/2)×q respectively; $W_2$ is a matrix of r columns, wherein p and q are positive integers, and r is a rank of the precoding matrix, m corresponds to a quantity of rows in the antenna port structure, and n corresponds to a quantity of columns in the antenna port structure; and report a precoding matrix indicator (PMI) to the base station, wherein the PMI is used to indicate the selected precoding matrix.

14. The non-transitory computer readable medium of claim 13, wherein reporting the PMI to the base station comprises:

separately reporting a first PMI used to indicate the matrix $W_1$ and a second PMI used to indicate the matrix $W_2$ to the base station.

15. A non-transitory computer readable medium storing instructions for receiving channel state information that, when executed by a processor, cause the processor to:

send a reference signal to user equipment based on reference signal resource configuration information, the reference signal resource configuration information comprises antenna port configuration information, the antenna port configuration information is used to indicate an antenna port structure; and receive a precoding matrix indicator (PMI) reported by the user equipment, wherein the PMI is used to indicate a precoding matrix selected by the user equipment, the precoding matrix is selected by the user equipment from a codebook based on the reference signal, and a structure of the precoding matrix corresponds to the antenna port structure indicated by the antenna port configuration information, wherein the structure of the precoding matrix is $W=W_1W_2$, wherein $$W_1 = \begin{bmatrix} X & 0 \\ 0 & X \end{bmatrix},$$

and X=A⊗B; ⊗ indicates a Kronecker product; A and B are matrices of (n/2)×p and m×q respectively, or A and B are matrices of n×p and (m/2)×q respectively; $W_2$ is a matrix of r columns, wherein p and q are positive integers, and r is a rank of the precoding matrix, m corresponds to a quantity of rows in the antenna port structure, and n corresponds to a quantity of columns in the antenna port structure.

16. The non-transitory computer readable medium of claim 15, wherein receiving the PMI reported by the user equipment comprises:

separately receiving a first PMI used to indicate the matrix $W_1$ and a second PMI used to indicate the matrix $W_2$ that are reported by the user equipment.

* * * * *

UNITED STATES PATENT AND TRADEMARK OFFICE
CERTIFICATE OF CORRECTION

PATENT NO. : 10,868,600 B2
APPLICATION NO. : 14/868762
DATED : December 15, 2020
INVENTOR(S) : Wang et al.

It is certified that error appears in the above-identified patent and that said Letters Patent is hereby corrected as shown below:

On the Title Page

Item (71), "Applicant", Line 2: replace "Guangdong (CN)" with --Shenzhen, Guangdong (CN)--
Item (73), "Assignee", Line 2: replace "Shenzhen (CN)" with --Shenzhen, Guangdong (CN)--

In the Specification

Column 21, Line 14: replace "matrices of in mxB and" with --matrices of mxp and--

Signed and Sealed this
Twenty-fifth Day of October, 2022

Katherine Kelly Vidal
*Director of the United States Patent and Trademark Office*